Oct. 27, 1970 W. ARNDT 3,536,843

CONTROL CIRCUIT FOR ESTABLISHING CONNECTIONS
IN A SWITCHING NETWORK

Filed Dec. 6, 1966 2 Sheets-Sheet 2

United States Patent Office 3,536,843
Patented Oct. 27, 1970

3,536,843

CONTROL CIRCUIT FOR ESTABLISHING CONNECTIONS IN A SWITCHING NETWORK

Wolfgang Arndt, Ludwigsburg, Germany, assignor to International Standard Electric Corporation, New York, N.Y., a corporation of Delaware
Filed Dec. 6, 1966, Ser. No. 599,496
Claims priority, application Germany, Dec. 16, 1965, St 24,772
Int. Cl. H04q 3/42
U.S. Cl. 179—18 7 Claims

ABSTRACT OF THE DISCLOSURE

A multi-stage crosspoint arrangement has two sections, each having a star-type condition. A connecting path is selected from a marked input to an arbitrary output with a two step selecting process. Information obtained after the first selecting step indicates whether a connecting path is available at all, if so the call is completed. At first, an input and all idle outputs are marked and an intersecting point is selected. Thus, a path is determined within the first section, and by extending the marking at the selected intersecting point, a path is selected within the second section.

The invention relates to controls for establishing a connection between a marked input and an arbitrary output of a crosspoint arrangement, consisting of two sections, both having a generally star-type condition.

A crosspoint arrangement with star-type condition is understood as being one in which only one single connecting path is possible between an input and any output. Of course, any one input may reach either some or all outputs, but each over just one single path.

In a multi-stage crosspoint arrangement with star-type condition, a conjugated selection can be carried out in a simple manner. That is, all idle outputs which can be reached from a marked input are marked by means of a control-wire network superimposed on the speech-wire network, and thereupon one of these outputs is selected. Since a crosspoint arrangement with a star-type arrangement is concerned, the connecting path between the marked input and the selected output is unique to a particular path which is determined and can be through-connected.

This method, in which one may "look" from the marked input through the entire crosspoint arrangement in order to investigate the possibilities of making a connection, provides an excellent way to control the establishment of a connection between a defined input and an arbitrary output. For convenience of expression, this connection may be stated to be "one completed from a 'point' to an 'edge' of a crosspoint arrangement."

In order to make full use of the advantages of the conjugated selection of connecting paths, it is desirable to complete this selection across as many stages of a switching network as possible. The time required to make such a selection depends primarily on the number of selecting processes which are to be carried out successively. According to the invention, only one single selecting process is required.

Some crosspoint arrangements consist of two sections, each having star-type conditions for "point-point" connections. These connections may be extended from a marked input of the first and a marked output of the second section. Therefore, only one selecting process is required at the intersection of both sections.

To carry out a conjugated "point" to an "edge," selection in a crosspoint arrangement comprising two sections, a first selecting process finds an idle output of the second section. Then, the problem is reduced from a point-to-edge to a "point-to-point" connection. With the aid of another selecting process at the intersection of both sections, a connecting path can be selected between the marked input of the first section and the selected output of the second section. However, it is necessary that a link is available between the input and the output. If this proves not to be the case, another output must be found during a third selecting process. Then, a link is again sought during a fourth selecting process. These processes must be repeated as often as necessary until such a link has been found. This way, the information that a connecting path is busy and not available can be made only after all available outputs have been scanned. This method process is very time-wasting.

Accordingly, an object of the invention is to provide a control circuit which can accomplish the above described search in a manner such that the expenditure in time can be substantially reduced.

According to one aspect of the invention, a control-wire network is provided which simulates the speech-wire network of a first section. By means of this control-wire network all those links can be determined which connect the two sections and which can be reached from the marked input of the first section and from at least one idle output of the second section. During a first selecting process, one of these links is selected and the corresponding input of the second section is marked. With the aid of a control-wire network, associated with the second section, all outputs that can be reached from this input are determined. One of these outputs is selected in a second selecting process, and that determines the route which may be through-connected in both sections.

This method offers an advantage since the two selecting processes are all that are required to ascertain the possibility of completing a connection between a marked input ("point") of the first section and an arbitrary output ("edge") of the second section. If no such possibility exists, the all busy condition is determined during the first selecting process, and no time is thereafter wasted on useless searching.

The above mentioned and other features of this invention and the manner of obtaining them will become more apparent, and the invention itself will be best understood by reference to the following description of an embodiment of the invention taken in conjunction with the accompanying drawings, in which:

FIGS. 1, 2 and 3 schematically show the construction of crosspoint arrangements in which the invention can be applied;

Figure 1:
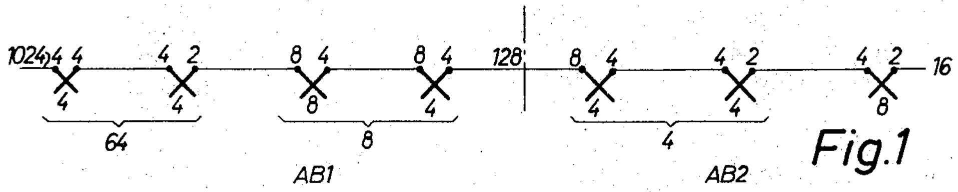

FIG. 1 shows a crosspoint arrangement with two sections AB1 and AB2, each having a star-type condition. Section AB1 comprises four switching stages, and section AB2 has three switching stages. In this exemplary network, 1024 subscribed lines are connected to the first stage of section AB1. This stage comprises 64 groups, each group having four switching multiples, and each switching multiple having four inputs and four outputs. The second switching stage comprises the same number of switching multiples, each switching multiple having four inputs and two outputs. The 512 outputs of this stage are connected to the inputs of the third switching stage, comprising eight groups, each group with eight switching multiples, each switching multiple having eight inputs and four outputs. This information is derived from the numbers on the drawing. The further construction of the crosspoint arrangement may clearly be gathered from the other numbers shown in FIG. 1.

Section AB1 has 128 outputs, each output being connected with one of the 128 inputs of the section AB2 via a link or intersection. The section AB2 possesses 16 outputs which might be connected to registers, for example.

Within section AB1, each of the 1024 inputs can reach one of the 128 outputs through only a single connecting path. The same applies for the 128 inputs and 16 outputs of section AB2. But several connecting paths are possible between one of the 1024 inputs of section AB1 and one of the 16 outputs of section AB2.

Figure 2:
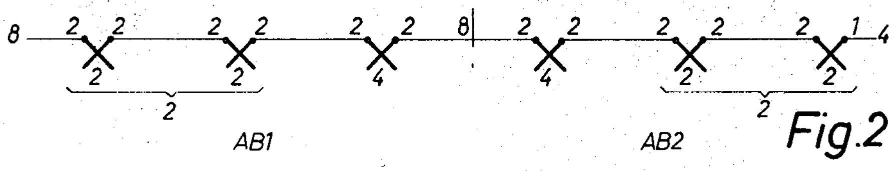

FIG. 2 shows a crosspoint arrangement constructed on essentially the same principle, but it is smaller. This arrangement comprises only eight inputs, eight links ZL1 . . . ZL8 at the intersection, and four outputs. All connections in this small crosspoint arrangement are shown in detail in FIG. 3. My co-pending U.S. patent application S.N. 563,176, filed July 6, 1966, indicates a method to control a crosspoint arrangement operating under star-type condition. FIG. 4 shows a switching multiple particularly suitable for carrying out the method according to the patent application mentioned. Its dimensions are adapted to the ones of the crosspoint arrangement according to FIGS. 2 and 3, i.e. it possesses two inputs and two outputs.

The inputs R and S are connected to a row, the outputs T and U to a column of the switching multiple. The speech wires are not shown. The drawing does show the control wires belonging to the switching multiple of a control-wire network superimposed upon and simulating the speech-wire network. At each crosspoint, a crosspoint-relay KP is provided with an activating winding I and a holding winding II. At each input—as, for example, input R—ground can be applied as marking potential via a contact *k*1, in order to indicate that this input shall be connected with an available output. In the non-operated condition the outputs of the control-wire network are connected to a potential of approximately —20 v. via individual resistors W. The dotted line between output T and resistor W indicates further switching multiples.

When contact *k*1 closes the following circuit is completed: ground, contact K1, input R, rectifier D*c*, contact *z*, rectifier D*k*, activating winding I of relay KP1, output T, similar circuits in further switching multiples, resistor W, and —20 v. Analogous circuits are formed through the activating winding I of relay KP2, the output U and further across other switching multiples to another resistor W. Other similar circuits spread from one input to two outputs in the switching multiple, as here shown. It also spreads in each of the other switching multiples (not shown). The outputs (such as T and U) always form the input (row) of another switching multiple, and so forth.

The value of the resistors W is chosen so that the activating windings I receive only a marginal current. Nearly a ground potential appears at point P, thus marking this output as reachable from the marked input. A selecting facility chooses one of the thus marked outputs, closing contact *x* at the selected output. The selected output thus receives operating current from the potential of —30 v., applied low-ohmic to the output and the activating windings I of the corresponding crosspoint relays KP which are series-connected between the marked input and the selected output. This operating current closes the crosspoint.

In the switching multiple shown in FIG. 4, the crosspoint relay KP1 responds and closes its contact *kp*. As soon as a connecting path is established, a reverse polarity holding current is applied to the selected path. More particularly, contact *y* closes at the output while contact x opens, thus applying a potential of +30 v. to the output. The rectifiers D*c* and D*k* are non-conductive while rectifier D*z* becomes conductive. The seize relay Z associated with the seized row responds via contact *kp* and the holding winding II of relay KP. Responsive thereto, its contact z opens the circuit through the activating windings I of relays KP1 and KP2 to the input R. Crosspoint relay KP1 remains energized in the holding circuit in series with relay Z as long as the contacts *k*1 and *y* remain closed.

As described in the patent application mentioned above, a switching network consisting of such switching multiples can be simply supplemented so that input and outputs are arbitrarily exchanged. To this end, each of the inputs is connected with a contact such as *k*1 and also with a high-ohmic resistor connected to —20 v. To establish a connection in the reverse direction, the output T serves as an input. To request a switch path, output T is marked with —30 v. by closing contact *x*. The marginal current then passes from —30 v. via the activating windings to the —20 v. source which is now connected to the input R, now serving as output. To through-connect, the path contact *k*1 is closed. For holding a path, the line contact *y* is closed, while contact *x* is opened. In a switching grid consisting of such switching multiples, the control-wire network is used for marking as well as for through-connecting and holding of paths.

Figure 3:
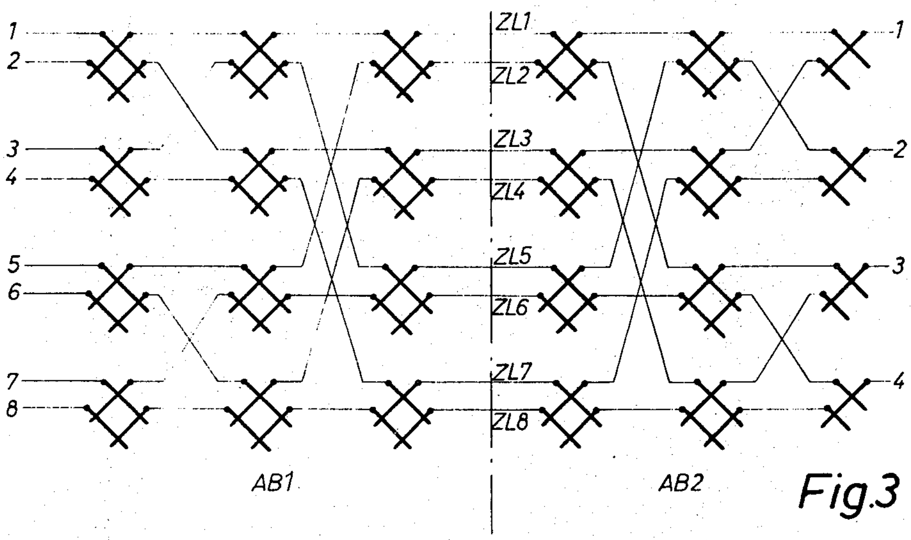
Figure 4:
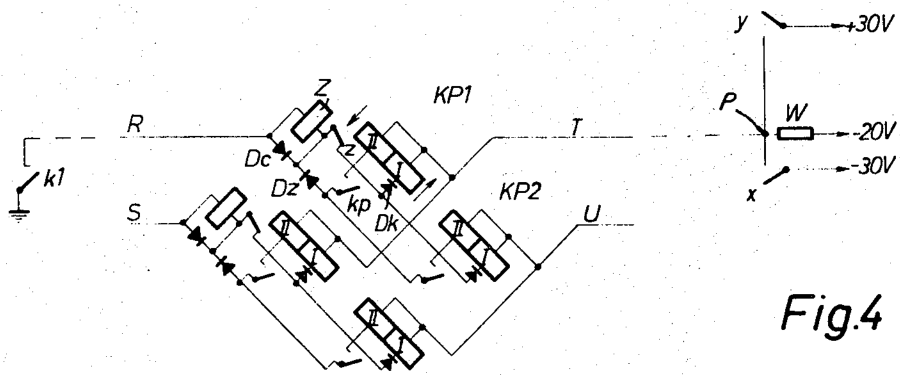
FIG. 4 shows an exemplary arrangement of a switching multiple.
Figure 5:
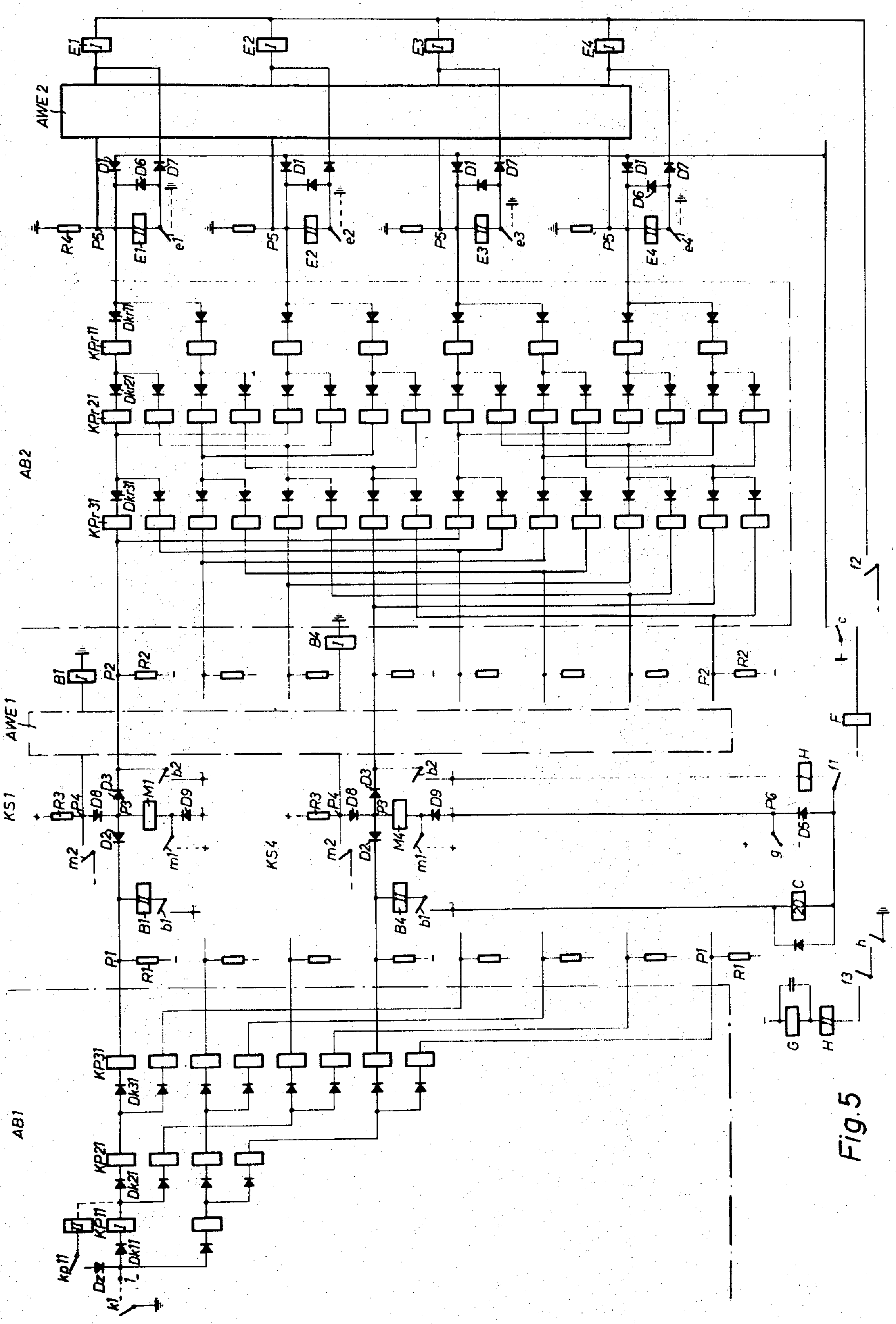
FIG. 5 shows a schematic circuit arrangement of a part of the crosspoint arrangement constructed according to the teachings of FIG. 3 by using the switching multiples constructed as demonstrated in FIG. 4.

FIG. 5 shows a crosspoint arrangement similar to that shown in FIGS. 2 and 3 for carrying out the invention. The individual switching multiples correspond to the ones shown in FIG. 4. The left section AB1 is provided to select a path from left to right. The section AB2 shown on the right side is used for selecting a connection in both directions, in the manner described in connection with the explanation given in conjunction with FIG. 4. The disclosure of FIG. 5 has been limited to the control-wire network and the circuits passing through the activating windings I which represent the possible paths between input 1 and the outputs 1 to 4 of the switching grid shown in FIG. 3. The holding winding II together with the series-connected contact *kp*11 and the rectifier D*z* are also shown, but only for the crosspoint relay KP11.

At first it is assumed that all paths are available. If now input 1 is marked with ground potential by the closing of contact *k*1, the following circuit is formed: ground, contact *k*1, point 1, DK11, relay KP11–1, diode D*k*21, winding KP21, diode D*k*31, relay KP31, point P1, resistor R1, and a negative potential source.

The same circuits are formed, according to the spreading principle described, from the input 1 to each of the eight outputs of section AB1, each being connected across a resistor R1 high-ohmic to negative potential. At point P1 and at the corresponding points of the other outputs, a nearly negative potential appears, while in the different current paths the series-connected activating windings of three crosspoint relays receive only a marginal current.

At the four outputs of section AB2, a low-ohmic ground is applied constantly across contact *c* and the individual rectifiers D1. Assuming that all connecting paths are available, the ground potential spreads from the points P5 at each of the four outputs to the points P2 of the eight inputs of said section AB2. Only a marginal current flows through the activating windings of the crosspoint relay KP*r* because point P2 and the corresponding points of the other outputs of section AB2 are applied to negative potential via high-ohmic resistors R2. Therefore, these points P2 have approximately ground potential. One of these marginal current circuits is indicated: ground potential, contact *c*, diode D1, diode D*kr*11, relay KP*r*11, diode D*kr*21, relay KP*r*21, diode D*kr*31, relay KP*r*31, point P2, and resistor R2 to a source of negative potential.

As already explained with the aid of FIG. 4, the activating windings of the associated crosspoint relays are disconnected by a contact of a seizing relay from the already seized rows of switching multiples. These contacts are not shown in FIG. 5, but it is clear that the described marginal current circuits in both sections can be established only across the control wires which correspond to idle and available connecting paths.

A coincidence circuit KS is provided for each of the links ZL shown in FIG. 3 and connecting the two sections, as shown in FIG. 5. Each coincidence circuit consists of three rectifiers D2, D3, D8 and of a resistor R3, connected to a source of positive potential. In such a coincidence circuit, the point P4 is brought to nearly a negative potential, if the two associated points P1 and P2 both carry the negative potential applied through the resistors R1, R2. In other words, if an output of section AB1 is marked by ground potential at point P1 to indicate that it is available to the marked input 1 and the corresponding input of section AB2 is marked by ground potential at point P2 to indicate that it is available to an idle output of said section, the point P4 of the corresponding coincidence circuit KS also bears ground potential. This condition characterizes the associated link ZL shown in FIG. 3 as suitable for establishing a connection between input 1 to an available output. If none of the coincidence circuits KS are triggered after an input has been marked, it is an indication that no connecting paths are available at the moment.

A selecting device AWE1 now selects one of the coincidence circuits which is in the described condition and causes a relay B, associated therewith, to operate via its winding I. This relay B closes its contacts *b*1 and *b*2. It is assumed that relay B1 of the coincidence circuit KS1 has responded. When contact *b*1 closes the series-connected activating windings KP11, KP21, KP31 are connected to a low-ohmic source of negative potential via the winding II of relay B1, the winding of relay C, the rectifier D5, point P6, contact *g*. The crosspoint relays mentioned above operate and relay B1 is held in series with relay C.

At contact *c*, the low-ohmic ground potential is removed from the outputs of section AB2, and an operating circuit is completed for relay F over the circuit from ground, through contacts *c*, and relay F, to negative potential. Relay F responds and closes contact *f*1 to apply a low-ohmic negative potential to point P2 at the input of section AB2 which is selected by an operated relay B1 acting through its contact *b*2, which is closed. The circuit is completed via contact *f*1, winding I of relay H, and the selecting contact *b*2. This potential may "grip through" over control-wires corresponding to available routes to the points P5 of the outputs of section AB2, marked by ground applied high-ohmic via resistors R4. This causes marginal current circuits to be formed for the respective crosspoint relays. One of these possible marginal current circuits is: negative potential contacts *g*, point P6, diode D5, contacts *f*1, relay winding HI, contacts *b*2, point P2, crosspoint winding KP*r*31, and diode D*kr*31. A second crosspoint KP*r*21, and diode D*kr*21, relay KP*r*11 and its diode D*kr*11, resistor P5, R4, ground. The appearance of negative potential at point P5 indicates that this output of section AB2 can be reached from the marked input of this section and, consequently, also from the marked input 1 of section AB1.

A selecting device AWE2 of any convenient design now selects one of the points P5 bearing negative potential (e.g. the topmost) and energizes the relay E1 associated to this selected output. The high-ohmic winding I of the selected E relay is applied to a negative potential via the closed contact *f*1. Contact *e*1 of this relay closes and connects point P5 to a low-ohmic ground via the rectifier D6. Relay E1 is held through its contact E1 and rectifier D7. An activating circuit is now closed for the crosspoint relays KP*r*11, KP*r*21, KP*r*31 and for the relay H, the circuit being traced from negative potential to ground via contact *b*2 and contact *e*1.

An activating circuit is closed for the delayed operating relay G via contact *h*, contact *f*3, and relay H, which is held operative through its winding II. After relay G has responded, the point P6 is disconnected from negative potential and connected to positive potential via the operated contact *g*. This causes the relay (such as relay M1) associated with the selected coincidence circuit KS1 to respond via the circuit from positive potential through contact *g*, point P6, diode D9, relay M1, point P3 and further, on one hand, across the holding windings (not shown on the drawing) of the crosspoint relays KP31, KP21, the shown holding winding II of relay KP11, contact *kp*11, rectifier Dz, and contact *k*1 to ground, and, on the other hand, via diode D3, the not shown holding windings of relays KP*r*31, KP*r*21, KP*r*11, winding II of relay E1, and contacts *e*1 to ground. Relay M1 responds and closes its contact *m*1 to complete a holding circuit for itself and for all other relays mentioned. The relays C, F, G and H drop. After contact *f*2 has opened, the rectifier D6 is rendered non-conductive and the winding II of relay E1 operates as a holding winding. Point P4 of the coincidence circuit KS1 is connected to negative potential via contact *m*2. This coincidence circuit marked busy and not considered during the following selecting process. The rectifier D8 isolates and decouples the points P3 and P4. When ground potential is again applied through contact *c* to the outputs, this potential remains ineffective at the seized output due to the rectifier D1.

The positive holding potential is disconnected through contact *m*1, and the connecting path is thereupon released. This connection is shown in dotted lines, in order to indicate that a release contact is series-connected with contact *m*1.

A partial release can be performed within section AB1 by opening contact *k*1 and within section AB2 by removing the ground potential from contact *e*1.

The invention has been explained with the aid of a circuit arrangement which uses only a single-wire for controlling the network in a particularly advantageous manner. This control wire is superimposed on the speech-wire network for marking, through-dialling, and holding connecting paths. Of course, this invention may also be used in crosspoint arrangements in which the through-connection and holding is performed in other ways. The only condition is that each of the two sections must have star-type conditions and that means are provided for "looking through" each section. With other words: a marking voltage applied to one end must be able to grip through to the other end across the available connecting paths.

While the principles of the invention have been described above in connection with specific apparatus and applications, it is to be understood that this description is made only by way of example and not as a limitation on the scope of the invention.

I claim:

1. A telephone switching system comprising, a control circuit means for establishing a connection from a marked input to an arbitrary idle output of a voice crosspoint network arrangement, said network having two sections wired in a star-type configuration, a plurality of interconnection links between the two sections, means in said control circuit comprising a control-wire network simulating a speech-wire network in said arrangement, means for marking all those interconnection links that connect the two sections which can be reached from the market input of the first section and at least one idle output of the second section, means for selecting one of these interconnecting links and marking the corresponding input of the second section, means for marking via the control-wire network associated with the second section all outputs that can be reached from the marked input of the second section, means for selecting one of the outputs in a second selecting process and thus determining routes which are through-connected in both sections, means for constantly marking all idle outputs of the second section and means for disconnecting this marking after selection of a link and during the further establishment of the connection, means for applying a reference potential to each input of the control-wire network associated with the first section, the presence of said reference potential on the presently idle points raising possibilities for completing a connection within said section to all available idle outputs, and means comprising a coincidence circuit associated with each of the links connecting the two sections, said coincidence circuit responding to complete a connection if the reference potential is applied to the associated output of the first section and to the associated input of the second section.

2. The circuit according to claim 1 and means for selecting among the coincidence circuits which have responded, means associated with said coincidence circuit for disconnecting the reference potential from the outputs of the second section and applying a potential of defined polarity to the associated input of the second section.

3. The circuit according to claim 2 and means for extending the potential of defined polarity across the second section in accordance with the presently prevailing possibilities of connection to all available idle outputs of said section.

4. The circuit according to claim 3 and a second selecting means for selecting one of the outputs of the second section at which the potential can be tapped and causing a switching means associated with said output to respond.

5. The circuit according to claim 4 and means responsive to said switching means for applying a through-connecting potential to the activating windings of the crosspoint relay located within the connecting paths in the first or the second sections.

6. The circuit according to claim 5 and means responsive to the establishment of a path for operating another switching means in the coincidence circuit, said other switching means having a self-holding circuit, means for applying the holding windings of the respective crosspoint relays to holding potentials, and means for releasing a connection by disconnecting the self-holding circuit of said switching means.

7. The circuit according to claim 6 and means for busy marking the link seized by a through-connected path by blocking its coincidence circuit through the switching means associated with said coincidence circuit.

References Cited

UNITED STATES PATENTS

| | | |
|---|---|---|
| 3,310,633 | 3/1967 | Schonemeyer. |
| 3,324,249 | 6/1967 | Cotroneo et al. |
| 3,342,947 | 9/1967 | Bock. |
| 3,395,251 | 7/1968 | Taylor. |

KATHLEEN H. CLAFFY, Primary Examiner

W. A. HELVESTINE, Assistant Examiner